US008079906B2

(12) United States Patent
Osawa

(10) Patent No.: US 8,079,906 B2

(45) Date of Patent: Dec. 20, 2011

(54) GAME MACHINE AND GAME SYSTEM

(75) Inventor: Akira Osawa, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 765 days.

(21) Appl. No.: 11/438,255

(22) Filed: May 23, 2006

(65) Prior Publication Data

US 2006/0287042 A1 Dec. 21, 2006

(30) Foreign Application Priority Data

May 31, 2005 (JP) ................................ P2005-158804

(51) Int. Cl.

*A63F 9/24* (2006.01)
*A63F 13/00* (2006.01)
*G06F 17/00* (2006.01)
*G06F 19/00* (2011.01)

(52) U.S. Cl. ................................ 463/34; 463/30; 463/31

(58) Field of Classification Search .................... 463/16, 463/18, 39, 40, 42, 43, 30

See application file for complete search history.

(56) References Cited

U.S. PATENT DOCUMENTS 6,569,018 B2 * 5/2003 Jaffe ................................ 463/30
6,652,378 B2 * 11/2003 Cannon et al. .................. 463/20
6,869,361 B2 * 3/2005 Sharpless et al. ............... 463/25
6,942,566 B2 * 9/2005 Baerlocher et al. ............. 463/16
7,008,324 B1 * 3/2006 Johnson et al. ................. 463/42
7,314,408 B2 * 1/2008 Cannon ............................ 463/16
2004/0087370 A1 * 5/2004 Tarantino ........................ 463/42
2005/0282629 A1 * 12/2005 Gagner ........................... 463/31

FOREIGN PATENT DOCUMENTS

JP 2004-267428 A 9/2004

* cited by examiner

*Primary Examiner* — David L Lewis

*Assistant Examiner* — Reginald A Renwick

(74) *Attorney, Agent, or Firm* — Arent Fox, LLP

(57) ABSTRACT

A game machine is connected to an information management device performing the collection and management of information for the game machine and including a display device on which specified play contents are displayed. The game machine comprises a first display (lower liquid crystal display), a second display (upper liquid crystal display) and a controller. The first display includes a variable display region for a plurality of patterns used in a game, and the second display displays play contents according to a game state. The controller controls the first display including the variable display region and controls the play contents for the second display, and the controller switches the play contents displayed by the second display to the specified play contents displayed by the display device of the information management device.

2 Claims, 11 Drawing Sheets

GAME MACHINE AND GAME SYSTEM

CROSS REFERENCE TO RELATED APPLICATIONS

This application is based upon and claims the benefit of priority from the prior Japanese Patent Application No. 2005-158804, filed on May 31, 2005; the entire contents of which are incorporated herein by reference.

BACKGROUND OF THE INVENTION

1. Field of the Invention

The present invention relates to a game machine and a game system, and more particularly relates to a game machine which has two display screens for performing games or game performances during the games, and a game system including the game machine.

2. Related Background of the Invention

In recent years, in the flow of game diversification, the constriction of systems (called "link type game systems"), which allow the participation of a plurality of game players by providing an information management device (host) separated from the game machines and by having the host communicate with the individual game machines, has been proposed. Conventional link type game systems include two main types of game systems. One type is a link type game system guided by the host, in which wins and losses of the game player are determined by results obtained in the host (lottery or the like). The other type is a link type game system called a progressive system, in which the game player can acquire special benefits (e.g., points or numbers of coins stored in the host) in accordance with results obtained in the game machine.

In such link type game machines, a system has been proposed which is devised so that when the cumulative quantity of game values reaches a certain predetermined value, the feeling of expectation on the part of the game players is heightened with new game characteristics by providing the game player finally participating in the achievement of the value with some type of reward (for example, see Japanese Patent Application Laid-Open No. 2004-267428). In such a system, the present cumulative quantity of game values is notified to the player on a display unit provided on the server device corresponding to the host and displaying the cumulative quantity of game values on this display unit.

However, in the conventional game systems of the type described above, the contents of the play managed on the host side that are directly connected to a heightened feeling of expectation on the part of the game players (here, the accumulation of game values) are displayed only on a display unit located on the host side. Accordingly, it is difficult for game players, who must also pay attention to base games played on the side of the game machine, to confirm the contents of the play.

In particular, in cases where an object displayed on the display unit located on the host side has higher game properties, e.g., requires some type of selection to be made by the game player, the inconvenience of the display in the above-mentioned display unit being difficult to confirm becomes an extremely serious problem.

SUMMARY OF THE INVENTION

In light of the above-mentioned problem; it is an object of the present invention to provide a game machine and game system which allow easy confirmation on the game machine side of the play contents managed by an information management device.

According to the present invention, a game machine is connected to an information management device which performs a collection and management of information for the game machine and which includes a display device on which specified play contents are displayed. The game machine comprises: a first display including a variable display region for a plurality of patterns used in a game; a second display for displaying play contents according to a game state; and a controller for controlling the first display including the variable display region and for controlling the play contents for the second display, wherein the controller switches the play contents displayed by the second display to the specified play contents displayed by the display device of the information management device.

According to the present invention, a game system comprises a plurality of game machines and an information management device. Each of the plurality of game machines includes a first display including a variable display region for a plurality of patterns used in a game, a second display displaying play contents according to a game state, and a controller for controlling the first display including the variable display region and for controlling the play contents for the second display. The information management device performs a collection and management of information for the plurality of game machines and includes a display device on which specified play contents are displayed. The controller switches the play contents displayed by the second display to the specified play contents displayed by the display device of the information management device.

DESCRIPTION OF THE PREFERRED EMBODIMENTS

Embodiments of the present invention will be described in detail below with reference to the attached drawings.

The game system according to an embodiment of the present invention comprises game machines and is applied to a link type game system. In the following description, a case will be described in which the present invention is applied to a so-called progressive link type game system (hereafter referred to as a progressive system). Furthermore, although a progressive system is described here, the present invention is not limited to this, and may also be applied to other link type game systems.

Here, a "progressive system" refers to a system which includes one game machine, in which at least some game values obtained by cumulatively adding game values in specified proportions (hereafter referred to as "cumulative game values") on the basis of game operations performed by the game player in the game machine are awarded to one of the game machines in accordance with specified conditions (e.g., payout conditions, selection by lot or the like).

Figure 1:
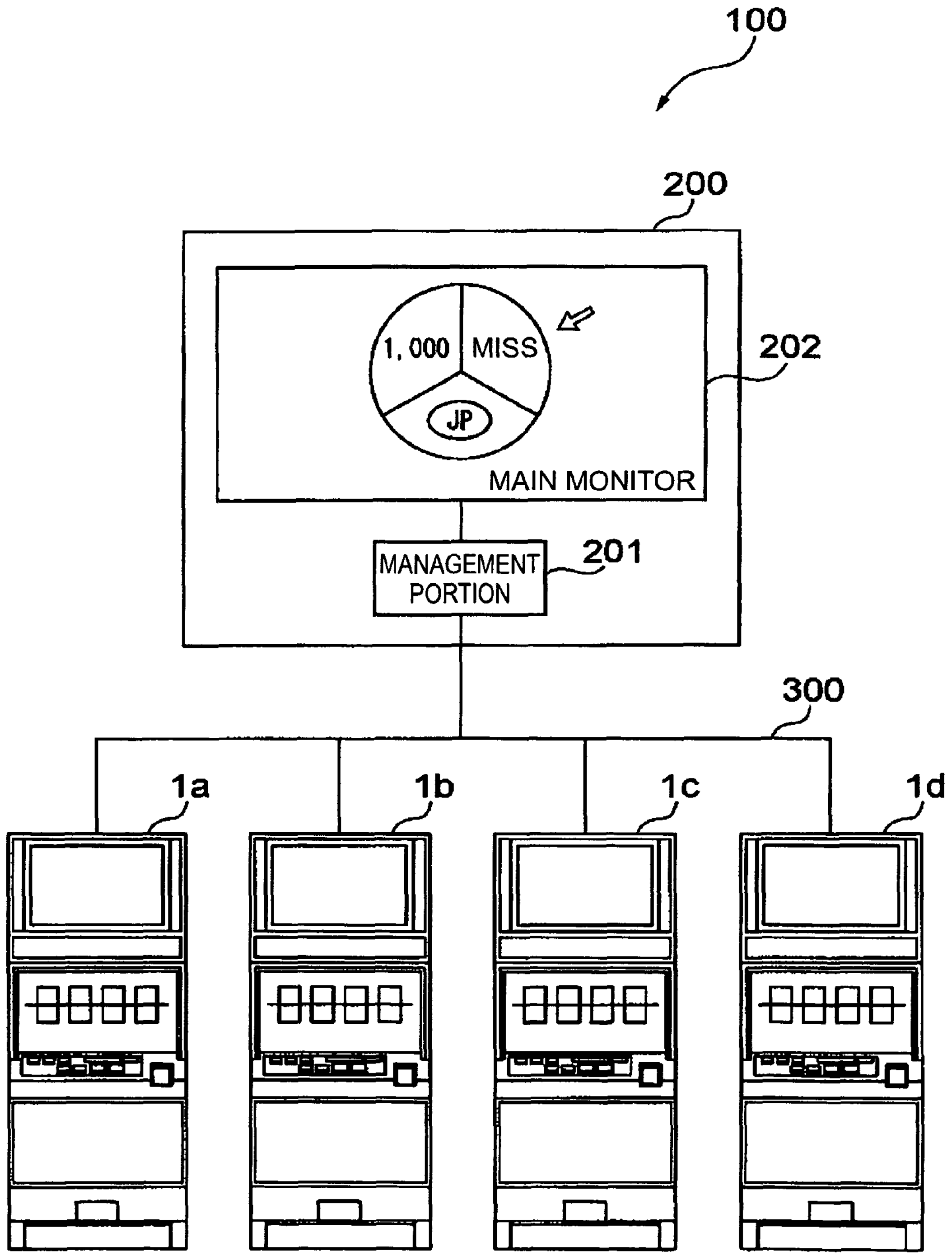
FIG. 1 is a schematic structural diagram of a game system according to an embodiment of the present invention.

FIG. 1 is a schematic structural diagram of the abovementioned game system constituting an embodiment of the present invention. In the game system 100 of the present embodiment, as shown in FIG. 1, a plurality of slot machines 1*a* through 1*d* (4 slot machines in FIG. 1) used as game machines, and an information management device 200 (hereafter referred to simply as a "management device") which collects and manages various types of information in the respective slot machines 1*a* through 1*d*, are connected via a communications network 300.

The management device 200 is constructed from a management portion 201 and a main monitor 202 that is connected to the management portion 201. The management portion 201 is connected to the respective slot machines 1*a* through 1*d* via the communications network 300, and is capable of two-way communications with the respective slot machines 1*a* through 1*d*. Furthermore, the connections between the management portion 201 and the respective slot machines 1*a* through 1*d* may be either connections by wire or wireless connections.

The management portion 201 manages this game system 100 in order to organize the progressive system. Specifically, the addition, subtraction and the like of cumulative game values are performed, and selections regarding the payout of cumulative game values and other game values are performed. Furthermore, the specified play contents are also displayed on the main monitor 202 in accordance with the selection results, and cumulative game values or other game values are paid out to the winning slot machine 1.

The main monitor 202 displays the values of cumulative game values, and displays the play contents including the chance selection process and chance selection results. The contents of the play (chance selection process, chance selection results and the like) displayed by the main monitor 202 may be contents of any type if the feeling of expectation on the part of the game player is heightened. For example, the game may be a game that is completely unrelated to base games played on such a slot machine 1, such as a roulette game, bingo game or the like. In the concrete example described later, for convenience of description, a case in which a simple roulette game is played as the contents of the play will be described.

Furthermore, in the management device 200, other constructions utilized for the contents of the play may also be provided. For example, the provision of a speaker that outputs effect sounds in accordance with the play contents, the provision of illumination that emits light in accordance with the play contents or the like is desirable as a configuration. In cases where such a construction is provided, the feeling of expectation on the part of the game player can be heightened in conjunction with the play contents displayed by the main monitor 202.

Figure 2:
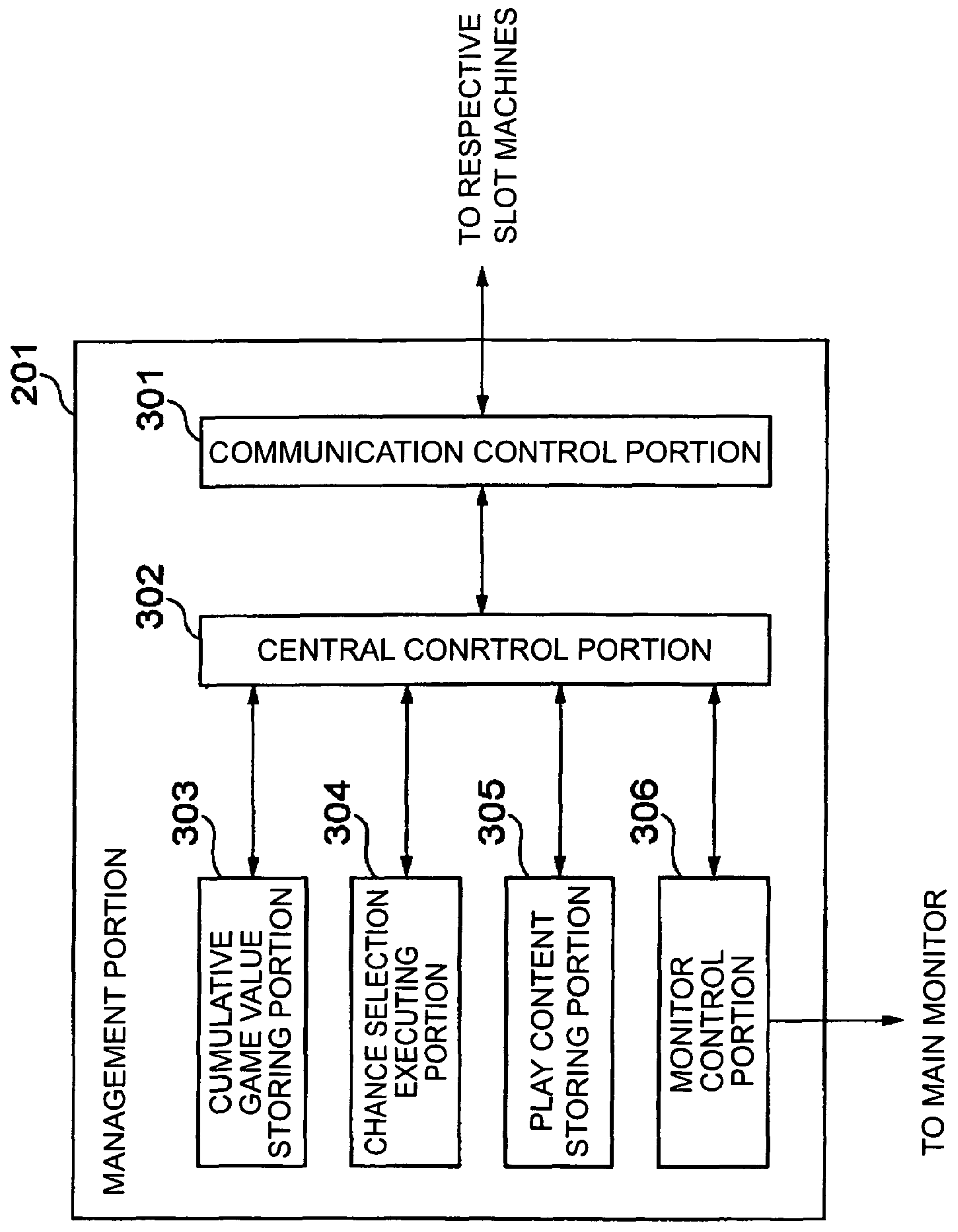
FIG. 2 is a functional block diagram showing an example of the construction of the management portion in the management device of the above-mentioned game system.

FIG. 2 shows a functional block diagram illustrating an example of the construction of the management portion 201. As shown in FIG. 2, the management portion 201 has a communication control portion 301, a central control portion 302 that is connected to the communication control portion 301, a cumulative game value storing portion 303 that is connected to the central control portion 302, a chance selection executing portion 304, a play content storing portion 305, and a monitor control portion 306.

The communication control portion 301 executes a communications protocol that is used to perform communications with the respective slot machines 1. In particular, in cases where the output of play contents managed by the management device 200 is required from the slot machine 1, negotiations are performed which are required when these play contents (more specifically image data of play contents) are output to the slot machine 1. The central control portion 302 determines the operations of various parts of the management portion 201, and performs control, adjustments, addition and subtraction of cumulative game values and the like. In particular, the central control portion 302 specifies slot machines 1 that have requested the output of play contents, and specifies the play contents to be output.

The cumulative game value storing portion 303 stores the values of cumulative game values. The chance selection executing portion 304 executes chance selections regarding the payout of cumulative game values in accordance with chance selection requests from the slot machines 1. In this case, the chance selection executing portion 304 executes chance selections of cumulative game values using a predetermined chance selection probability.

The play content storing portion 305 stores the play contents displayed by the main monitor 202. For example, play contents and the like in a special game state that allows easier and more advantageous acquisition of game values than the base game state of the slot machine 1 are included in the play contents stored in the play content storing portion 305. Using the play contents stored in the play content storing portion 305, the monitor control portion 306 controls the display of the main monitor 202 so that these play contents are displayed. Under such control of the monitor control portion 306, the main monitor 202 displays specified play contents to the player of the slot machine 1.

Figure 3:
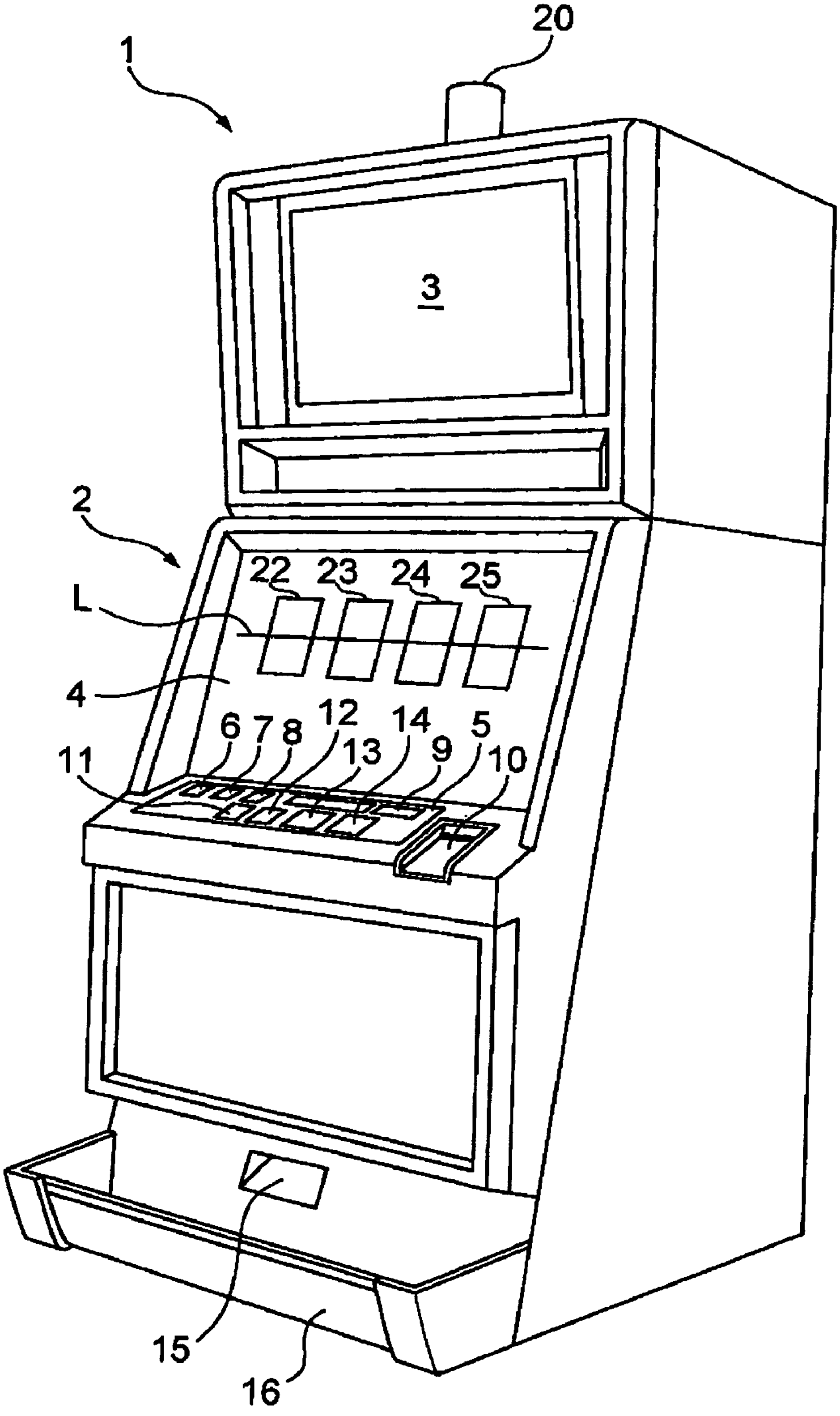
FIG. 3 is a perspective view showing the external construction of a slot machine in the above-mentioned game system.

Here, the construction of the slot machine 1 in the game system 100 of the present embodiment will be described. FIG. 3 is a perspective view showing the external construction of the slot machine 1 in a game system 100 constituting an embodiment of the present invention.

In FIG. 3, the slot machine 1 has a cabinet 2 forming the overall body of the slot machine 1, and a lamp 20 is installed on the upper part of the upper surface of this cabinet 2. An upper liquid crystal display 3 (second display) is disposed on the upper part of the front surface of the cabinet 2, and a lower liquid crystal display 4 (first display) is disposed on the central part of the front surface of the cabinet 2. The upper liquid crystal display 3 is generally constructed from an all-purpose liquid crystal display, and the lower liquid crystal display 4 is constructed from a so-called transparent liquid crystal display. Four variable display windows 22, 23, 24 and 25 (variable display regions) are displayed in the lower liquid crystal display 4, and a single effective win line L is disposed on the four variable display windows 22 through 25. Furthermore, the upper liquid crystal display 3 functions as the second display means, and the lower liquid crystal display 4 functions as the first display means.

An operating table 5 that protrudes toward the front is installed beneath the lower liquid crystal display 4. From the left end, a CHANGE button 6, a CASH OUT button 7 and a HELP button 8 are installed on the operating table 5. Furthermore, a coin insertion portion 9 and a bill insertion portion 10 are disposed on the right side of the HELP button 8. Furthermore, a 1-BET button 11, a SPIN/REPEAT BET button 12, a 3-BET button 13 and a 5-BET button 14 are disposed from the left on the front side of the operating table 5.

The CHANGE button 6 is a button that is used to light the lamp 20. The CASH OUT button 7 is a button that is ordinarily pressed when the game is ended. When the CASH OUT button 7 is pressed, coins are paid out into a coin receiving portion 16 from a coin pay-out opening 15 as game values accumulated in the game. The HELP button 8 is a button that is pressed in cases where the game operating method or the like is unclear. When the HELP button 8 is pressed, various types of help information are displayed on the upper liquid crystal display 3 or lower liquid crystal display 4.

A coin sensor 65 is disposed in the coin insertion portion 9 and detects inserted coins. A bill sensor 66 is disposed in the bill insertion portion 10 and detects inserted bill. The 1-BET button 11 is a button that causes one bet to be placed each time that this button is pressed. The SPIN/REPEAT BET button 12 is a button which initiates a fluctuating display of various patterns in the respective variable display windows 22 through 25 of the of the lower liquid crystal display 4, in order to initiate a game at the current number of bets or a previous number of bets, as a result of being pressed.

The 3-BET button 13 is a button that is used to initiate a game at three bets when pressed. The 5-BET button 14 is a button that is used to initiate a game at five bets when pressed. A coin pay-out opening 15 is formed in the lower part of the cabinet 2, and a coin receiving portion 16 that receives coins from the coin pay-out opening 15 is also provided.

Four reels are disposed in positions facing the four variable display windows 22 through 25 formed in the lower liquid crystal display 4. Of these four reels, the reel furthest to the left as seen from the front surface of the slot machine 1 faces the variable display window 22 formed in the lower liquid crystal display 4, and the reel on the left side of the center similarly faces the variable display window 23. Furthermore, the reel on the right side of the center similarly faces the variable display window 24, and the reel located furthest to the right similarly faces the variable display window 25.

Figure 4:
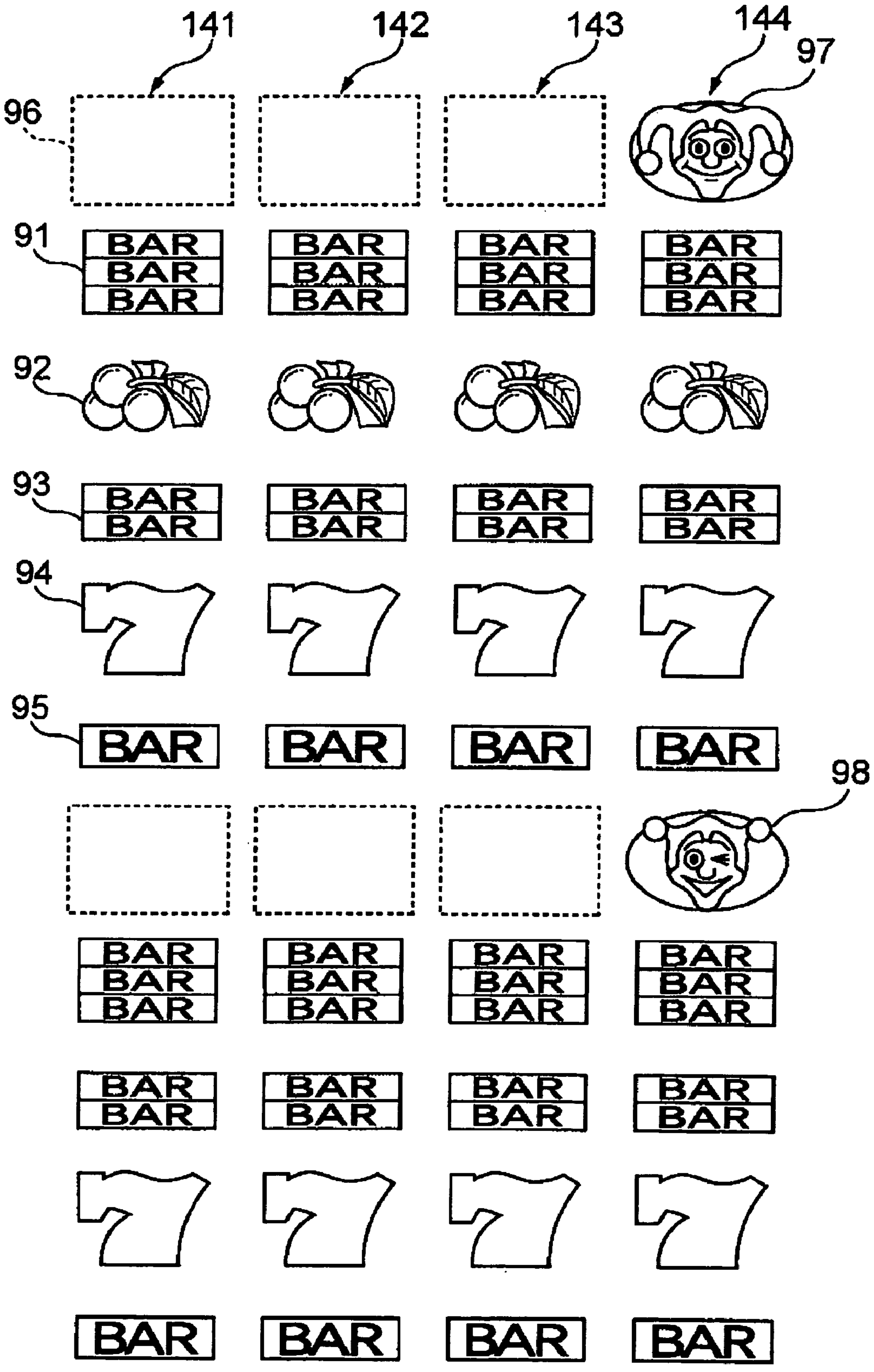
FIG. 4 is a diagram showing an example of patterns that are variably displayed in the variable display window of the above-mentioned slot machine.

The various types of patterns shown in FIG. 4, which are ordinarily used in games, are formed on the outer circumferential surfaces of the respective reels. FIG. 4 is a diagram showing examples of patterns that are formed on the outer circumferential surfaces of the respective reels, and that are ordinarily variably displayed during a game in the respective transparent variable display windows 22 through 25 of the lower liquid crystal display 4 while scrolling.

In FIG. 4, the pattern example 141 is an example of the pattern that is variably displayed by the variable display window 22, and the pattern example 142 is an example of the pattern that is variably displayed by the variable display window 23. Furthermore, the pattern example 143 is an example of the pattern that is variably displayed by the variable display window 24, and the pattern example 144 is an example of the pattern that is variably displayed by the variable display window 25.

The pattern examples 141, 142 and 143 have the same pattern arrangement in common, and these respective pattern examples are constructed from 11 patterns by the appropriate combination of a triple BAR 91, cherries 92, double BAR 93, seven 94, single BAR 95 and blank (region in which no pattern is present) 96. Furthermore, the pattern example 144 differs from the pattern examples 141, 142 and 143 in that one each of a first trigger symbol 97 and second trigger symbol 98 are disposed in this pattern example in addition to the patterns included in these other pattern examples.

As will be described later, the first trigger symbol 97 is a pattern that is used to cause a shift to (participation in) a bonus game (hereafter referred to as the "first bonus game") that is managed by the management device 200, and the second trigger symbol 98 is a pattern that is used to cause a shift to a bonus game (hereafter referred to as the "second bonus game") that is managed by the slot machine 1 (or more specifically by the CPU 50 described later). Shifts can be made to the first bonus game and second bonus game respectively in cases where the first trigger symbol 97 and second trigger symbol 98 are displayed in a stationary display on the effective win line L in the variable display window 23.

In the formation of the various types of patterns on the circumferential surfaces of the respective reels, these patterns are generally formed by printing 11 patterns on long reel sheets that match the width and circumferential length of the respective reels, and pasting these reel sheets to the circumferential surfaces of the respective reels. However, it would of course be possible to form these patterns by a method other than this method.

Furthermore, in cases where the respective pattern examples 141 through 144 that are scrolled in the respective variable display windows 22 through 25 are stopped and displayed, four patterns are stopped and displayed in the respective variable display windows 22 through 25. Furthermore, various types of winning patterns are set beforehand on the basis of combinations of a plurality of types of patterns, and when combinations of patterns corresponding to winning patterns stop on the effective win line L, coins are paid out from the coin pay-out opening 15 in accordance with the winning pattern as in a conventional slot machine. Accordingly, a further description will be omitted.

Figure 5:
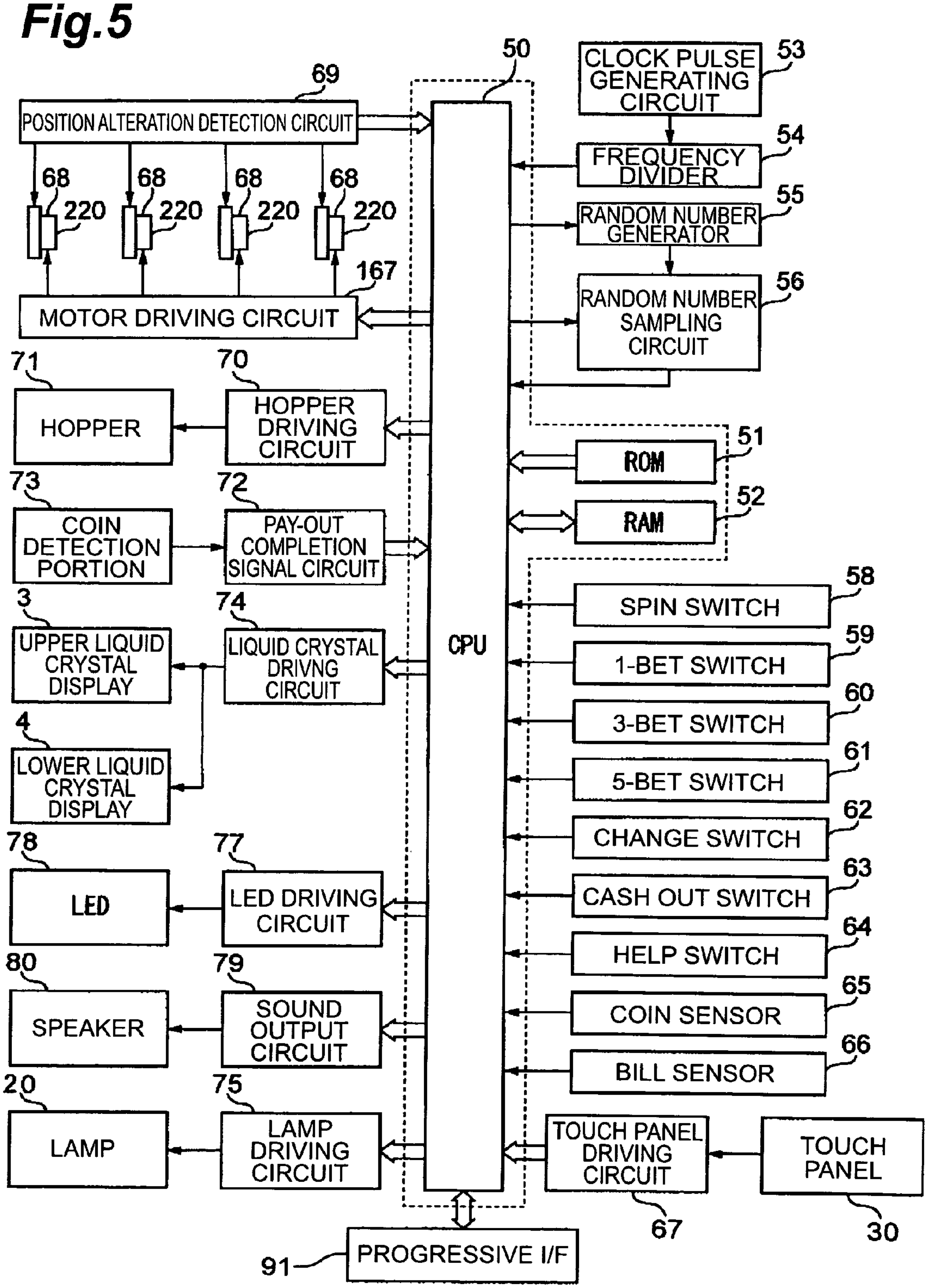
FIG. 5 is a block diagram schematically showing the control system of the above-mentioned slot machine.

Next, the construction relating to the control system of the slot machine 1 will be described with reference to FIG. 5. FIG. 5 is a block diagram which shows the control system of the slot machine in model form.

In FIG. 5, the control system of the slot machine 1 is centered on a CPU 50 used as a controller (control means). A ROM 51 and RAM 52 are connected to the CPU 50. The ROM 51 stores game control programs, various types of play programs used to perform various types of plays on the upper liquid crystal display 3 and lower liquid crystal display 4 as games progress, selection tables used to select various types of winning patterns, various other types of programs, data tables and the like needed for the control of the slot machine 1. The RAM 52 functions as a memory that temporarily stores various types of data calculated by the CPU 50.

Furthermore, the present embodiment is not limited to cases in which programs, data and the like used to control the slot machine 1 are stored in the ROM 51 or RAM 52 beforehand, and such programs and data can also be appropriately altered. For example, a construction may be used in which similar programs, data and the like are stored on a storage medium such as a Compact Flash (registered trademark) or the like, and are downloaded to the ROM 51 or the like from such a storage medium.

A clock pulse generating circuit 53 and frequency divider 54 which generate a reference clock pulse, and a random number generator 55 and random number sampling circuit 56 which generate random numbers, are connected to the CPU

50. The random numbers that are sampled via the random number sampling circuit 56 are used in various types of selections (of winning patterns and the like).

A SPIN switch 58 which is installed on the SPIN/REPEAT BET button 12, a 1-BET switch 59 which is installed on the 1-BET button 11, a 3-BET switch 60 which is installed on the 3-BET button 13, a 5-BET switch 61 which is installed on the 5-BET button 14, a CHANGE switch 62 which is installed on the CHANGE button 6, a CASH OUT switch 63 which is installed on the CASH OUT button 7, and a HELP switch 64 which is installed on the HELP button 8, are respectively connected to the CPU 50. The CPU 50 performs control operations to execute various types of operations corresponding to the respective buttons on the basis of the switch signals that are output from the respective switches when the respective buttons are pressed.

The coin sensor 65 that is installed in the coin insertion portion 9, and the bill sensor 66 that is installed in the bill insertion portion 10, are respectively connected to the CPU 50. The coin sensor 65 detects coins that are inserted from the coin insertion portion 9, and the CPU 50 calculates the number of inserted coins on the basis of a coin detection signal that is output from the coin sensor 65. The bill sensor 66 detects the type and amount of bills that is inserted from the bill insertion portion 10, and the CPU 50 calculates the amount of bills and equivalent number of coins on the basis of a bill detection signal that is output from the bill sensor 66.

A plurality of stepping motor 68 (four stepping motors in this example) that rotate the respective reels 220 are connected to the CPU 50 via a motor driving circuit 167. When motor driving signals (command pulses) are output to the motor driving circuit 167 from the CPU 50, the respective stepping motors 68 are rotationally driven by excitation signals that are output from the motor driving circuit 167. The CPU 50 counts the number of driving pulses supplied to each of the stepping motors 68, ascertains the rotational positions of the patterns in the respective reels 220 on the basis of the number of driving pulses thus counted, and performs stopping position control and the like.

A position alteration detection circuit 69 is connected to the CPU 50. The position alteration detection circuit 69 detects changes in the stopping positions of the reels 220 following stopping control from the above-mentioned motor driving circuit 167. For example, the position alteration detection circuit 69 detects alterations in the stopping positions of the reels 220 in cases where the stopping positions are forcibly altered by the player so that a combination of stopped patterns that constitutes a winning configuration is obtained in spite of the fact that the combination is not actually a combination of stopped patterns that constitutes a winning configuration. For example, the position alteration detection circuit 69 is constructed so that alterations in the stopping positions of the reels 220 can be detected by detecting fins that are attached to the inside parts of the reels 220 at specified intervals.

A hopper 71 is connected to the CPU 50 via a hopper driving circuit 70. When a driving signal is output to the hopper driving circuit 70 from the CPU 50, the hopper 71 pays out a specified number of coins from the coin pay-out opening 15. Furthermore, a coin detection portion 73 is connected to the CPU 50 via a pay-out completion signal circuit 72. The coin detection portion 73 is disposed inside the coin pay-out opening 15. In cases where it is detected that a specified number of coins have been paid out from the coin pay-out opening 15, a coin pay-out detection signal is output to the pay-out completion signal circuit 72 from the coin detection portion 73, and the pay-out completion signal circuit 72 outputs a pay-out completion signal to the CPU 50 on the basis of the coin pay-out detection signal.

Figure 6:
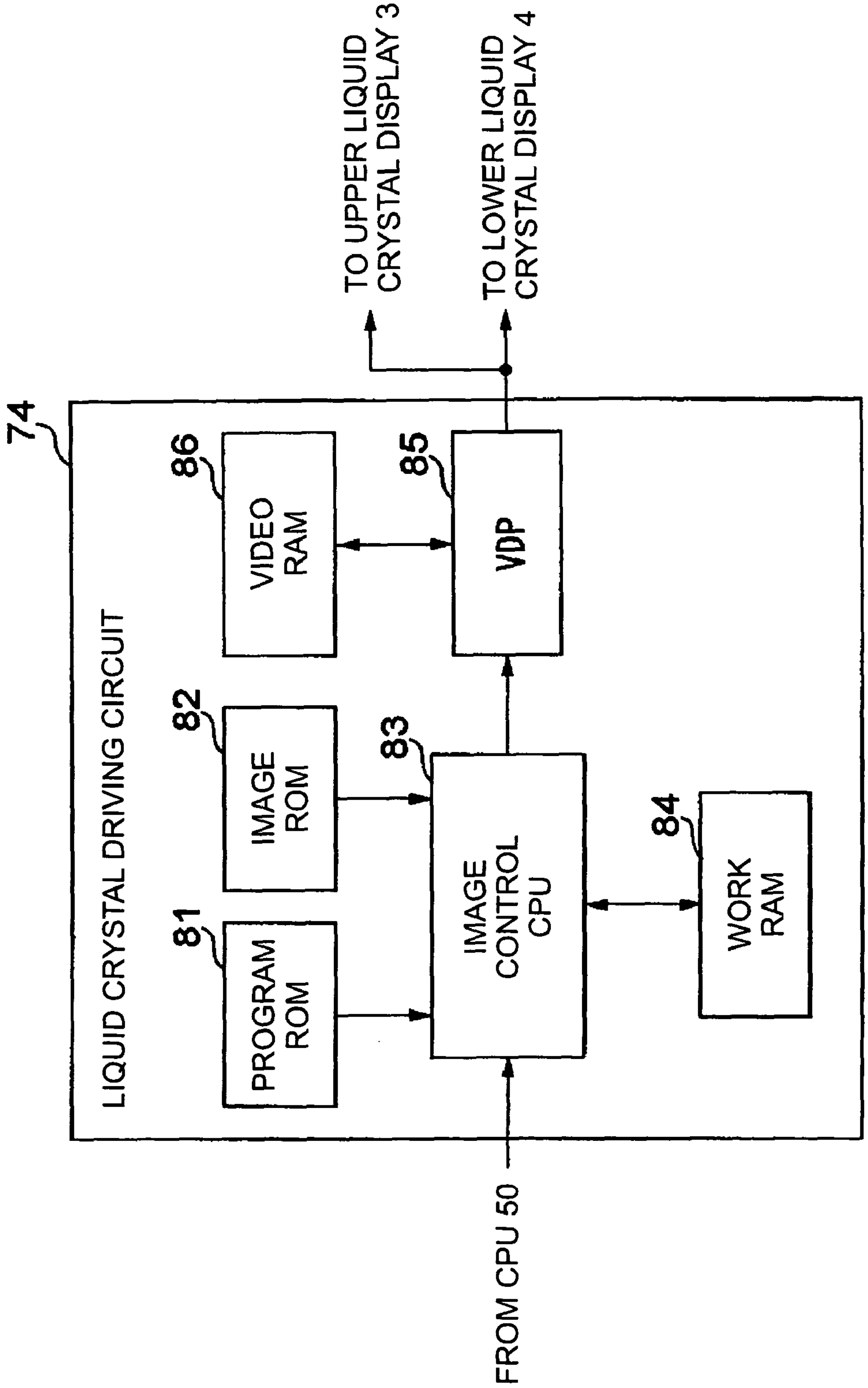
FIG. 6 is a block diagram schematically showing the liquid crystal driving circuit of the above-mentioned slot machine.

The upper liquid crystal display 3 and lower liquid crystal display 4 are connected to the CPU 50 via a liquid crystal driving circuit 74, and the upper liquid crystal display 3 and lower liquid crystal display 4 are controlled by the CPU 50. As shown in FIG. 6, the liquid crystal driving circuit 74 is constructed from a program ROM 81, image ROM 82, image control CPU 83, work RAM 84, VDP (video display processor) 85, video RAM 86 and the like.

In FIG. 6, image control programs relating to the displays of the upper liquid crystal display 3 and lower liquid crystal display 4, and various types of selection tables, are stored in the program ROM 81. For example, dot data and the like used to form images in the upper liquid crystal display 3 and lower liquid crystal display 4 are stored in the image ROM 82. The image control CPU 83 determines the images that are displayed on the upper liquid crystal display 3 and lower liquid crystal display 4 from dot data stored beforehand in the image ROM 82 in accordance with image control programs stored beforehand in the program ROM 81 on the basis of parameters set by the CPU 50. The work RAM 84 is constructed as a temporary storage means for use in cases where image control programs are executed by the image control CPU 83. The VDP 85 generates image data in accordance with the display content determined by the image control CPU 83, and outputs the data to the upper liquid crystal display 3 and lower liquid crystal display 4. Furthermore, the video RAM 86 is constructed as temporary storage means for use in cases where images are formed by the VDP 85.

LEDs 78 are connected to the CPU 50 via an LED driving circuit 77. Numerous LEDs 78 are disposed on the front surface of the slot machine 1, and the lighting of the LEDs 78 is controlled by the LED driving circuit 77 on the basis of driving signals from the CPU 50 when various types of play effects are performed. Furthermore, a sound output circuit 79 and a speaker 80 are connected to the CPU 50, and the speaker 80 is a portion that generates various types of sound effects when various types of play effects are performed on the basis of output signals from the sound output circuit 79.

A lamp 20 is connected to the CPU 50 via a lamp driving circuit 75. This lamp 20 is disposed on the upper surface of the slot machine 1 (see FIG. 3), and when the CHANGE button 6 is pressed, the lighting of the lamp 20 is controlled by the lamp driving circuit 75 on the basis of driving signals from the CPU 50.

A transparent touch panel 30 is connected to the CPU 50 via a touch panel driving circuit 67. The transparent touch panel 30 is disposed on the screen surface of the lower liquid crystal display 4, and is devised so that coordinate position information for parts touched by the game player is output via the touch panel driving circuit 67, thus making it possible for the CPU 50 to discriminate the parts that are touched. Accordingly, in the operating flow of the slot machine 1 described later, the CPU 50 can receive instructions from the game player to switch the display of the tipper liquid crystal display 3 by utilizing the touch panel driving circuit 67 and transparent touch panel 30. Specifically, the combination of the CPU 50, transparent touch panel 30 and touch panel driving circuit 67 cooperatively functions as an instruction receiver (instruction receiving means) for receiving switching instructions for the display of the upper liquid crystal display 3 from the game player.

A progressive interface (I/F) 91, which is a communications port used to perform communications with the management device 200, is installed on the CPU 50. The system is arranged so that the CPU 50 can send out requests for the output of play contents to the communication control portion 301 (see FIG. 2) of the management device 200 via the progressive I/F 91, and can receive image data corresponding to play contents from the communication control portion 301 of the management device 200.

Figure 7:
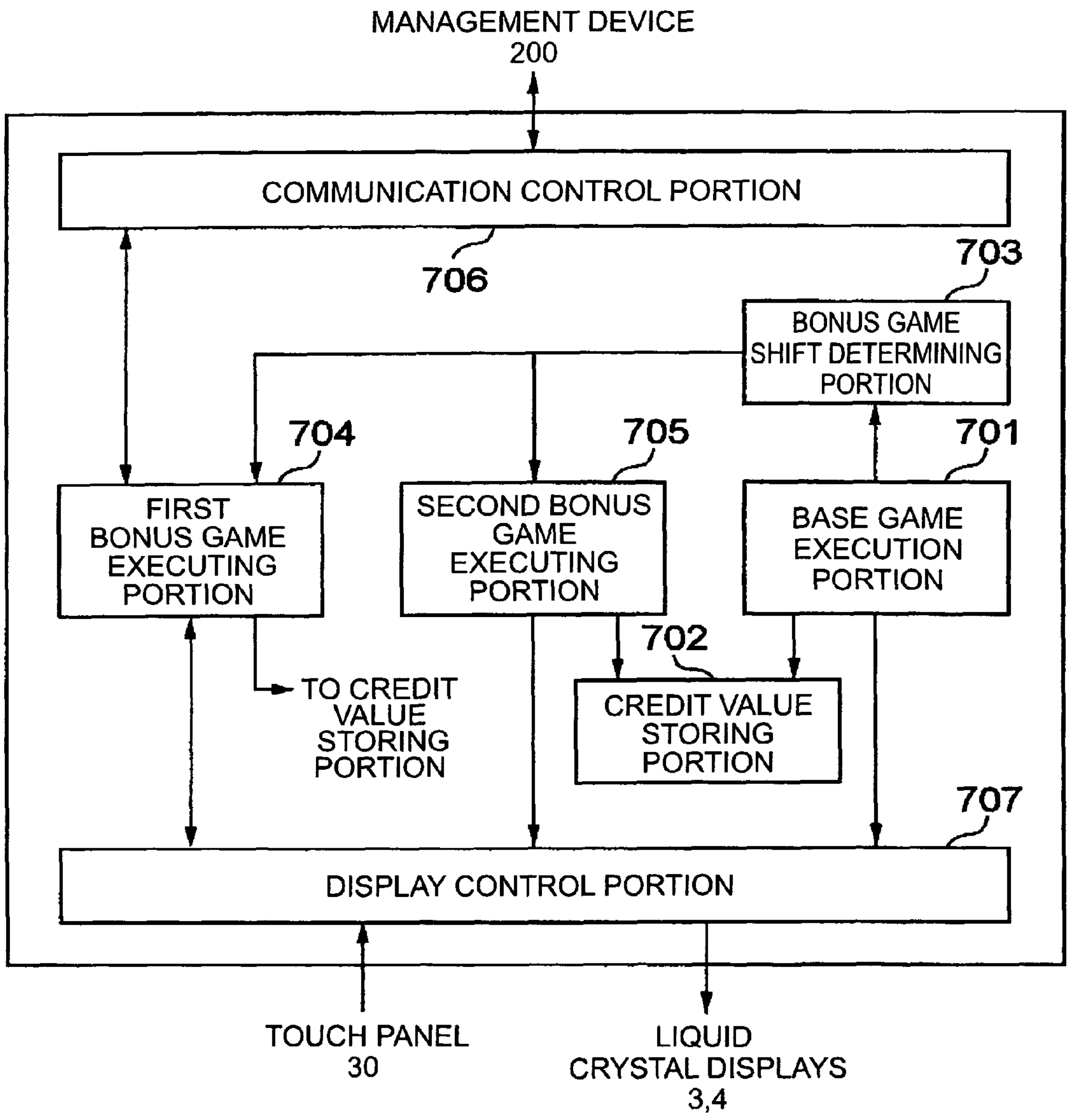
FIG. 7 is a functional block diagram of the above-mentioned slot machine.

The main functions of the slot machine 1 constructed as described above are realized mainly by processing executed by the CPU 50 using programs, data and the like stored in the ROM 51 and RAM 52. The functions of the slot machine 1 constituting the present embodiment will be described below. FIG. 7 is a functional block diagram of each slot machine 1.

As shown in FIG. 7, the slot machine 1 has a base game execution portion 701, a credit value storing portion 702, a bonus game shift determining portion 703, a first bonus game executing portion 704, a second bonus game executing portion 705, a communication control portion 706, and a display control portion 707. Furthermore, the respective portion 701 through 707 correspond to portions of programs, e.g., subroutines, functions, procedures and the like, that are executed by the CPU 50; there is no hardware corresponding to these respective parts.

The base game execution portion 701 has the function of executing base games in the slot machine 1. Specifically, this portion 701 executes selections according to the number of bets of the player, controls the rotation of the reels 220 in accordance with the selection results, determines the establishment of winning patterns according to the patterns of the stopped reels 220, and executes the pay-out of game values in winning cases.

The credit value storing portion 702 has the function of storing numerical values corresponding to game values inserted into the slot machine 1 by the player, and numerical values corresponding to game values acquired by means of base games or the like, as credit values. In cases where the player desires the pay-out of coins or the like, the value corresponding to the amount of this pay-out is subtracted from the value stored by the credit value storing portion 702, and a number of coins corresponding to the subtracted value is emitted by the hopper driving circuit 70 and hopper 71.

The bonus game shift determining portion 703 has the function of determining whether or not conditions have been established for a shift to the first or second bonus game. The conditions for such a shift to the first or second bonus game may be any desired conditions; in the present embodiment, however, the condition for a shift to the first bonus game is that the first trigger symbol 97 has stopped on the effective win line L, and the condition for a shift to the second bonus game is that the second trigger symbol 98 has stopped on the effective win line L.

The first bonus game executing portion 704 executes processing that is performed in cases where a shift is made to a first bonus game managed by the management device 200. Specifically, the first bonus game executing portion 704 executes processing that displays the play content of the first bonus game (hereafter referred to as "play content on the side of the management device") on the upper liquid crystal display 3, and executes processing that displays prepared play content (hereafter referred to as "play content on the machine side") on the upper liquid crystal display 3 in order to perform the play of the first bonus game on the slot machine 1 itself. When the former processing is performed, the first bonus game executing portion 704 performs communications with the management device 200 via the communication control portion 706, and acquires image data that is used to display the contents of the play on the side of the management device.

The second bonus game executing portion 705 executes processing that is performed in cases where a shift is made to a second bonus game that is managed by the slot machine 1. The second bonus game executing portion 705 has the function of executing the second bonus game. Specifically, this portion 705 executes the second bonus game, executes selections in the second bonus game, performs control operations in accordance with the selection results (in the case of a roulette game described later, this portion 705 controls the rotation of the roulette wheel, and determines and controls winning in accordance with the stopped roulette wheel), and the like. Furthermore, this portion 705 also performs processing that displays play contents prepared beforehand in accordance with the second bonus game on the upper liquid crystal display 3.

The display control portion 707 controls the displays of the upper liquid crystal display 3 and lower liquid crystal display 4 in accordance with instructions from the base game execution portion 701, first bonus game executing portion 704 and second bonus game executing portion 705. In the present embodiment, in specified cases, this part switches the display on the upper liquid crystal display 3 in accordance with instructions from the player applied to a display switching instruction key (described later) disposed on the lower liquid crystal display 4 (touch panel 30). In particular, as will be described in detail later, the display control portion 707 controls the upper liquid crystal display 3 to display the management device side play content and to display the machine side play content in accordance with instructions from the player.

Figure 8:
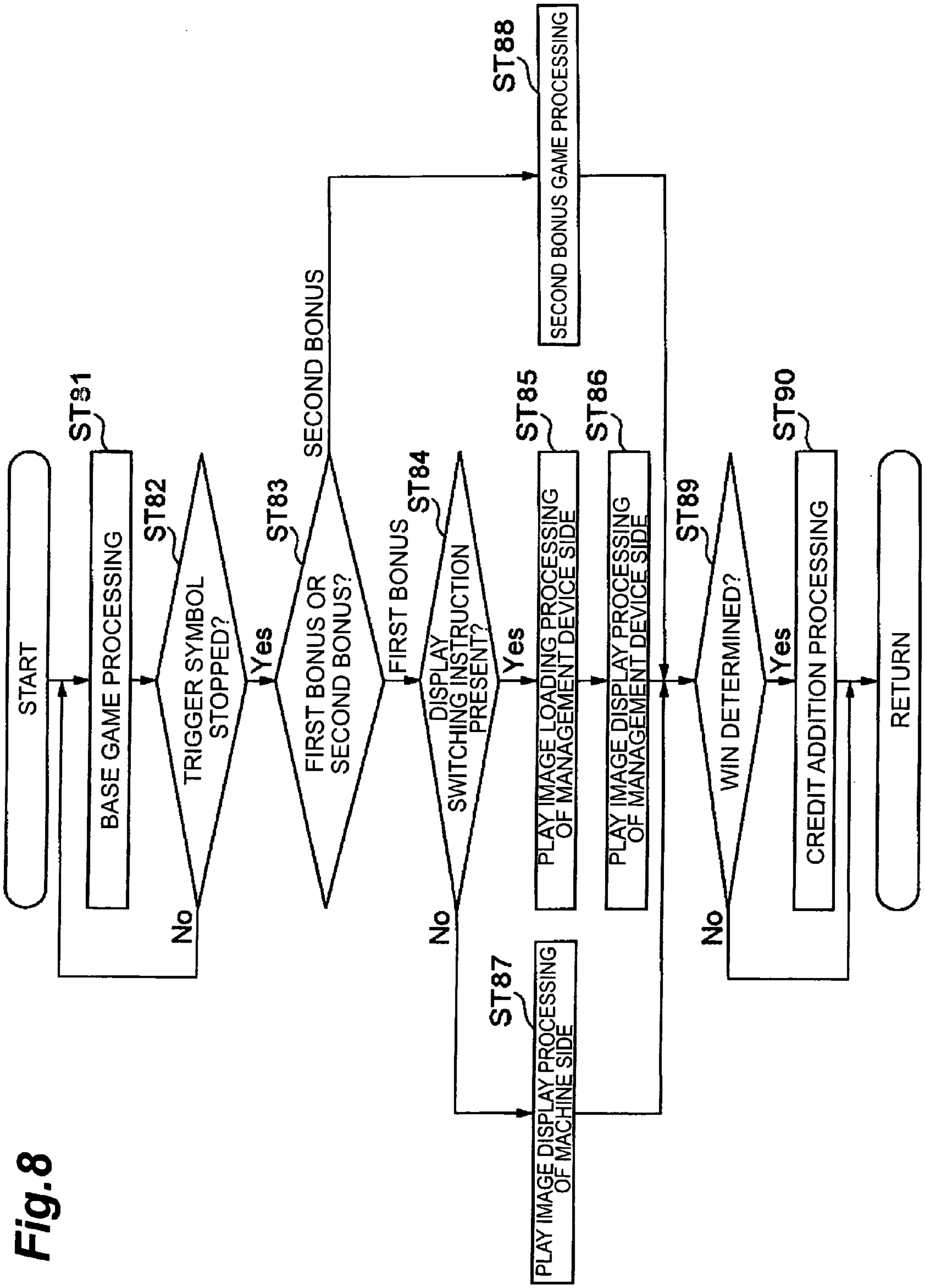
FIG. 8 is a flow chart used to illustrate the operation that switches the display of the upper liquid crystal display in the above-mentioned slot machine.

Next, the operation that switches the display of the upper liquid crystal display 3 in the slot machine 1 of the present embodiment will be described with reference to FIG. 8. FIG. 8 is a flow chart used to illustrate the operation that switches the display of the upper liquid crystal display 3 in the slot machine 1 of the present embodiment.

When an instruction given by the player is received from the SPIN/REPEAT BET button 12, the CPU 50 initiates base game processing in the slot machine 1 (step (hereafter abbreviated to "ST") 81). In this base game processing, the CPU 50 selects whether a stopped configuration of patterns on the reels 220 constitutes a winning configuration, and performs rotational control and stopping control of the reels 220 in accordance with the results of this selection.

In the process of performing this base game processing, the CPU 50 determines whether or not the trigger symbols 97 and 98 are stopped on the effective win line L (ST82). For example, this determination is performed in accordance with the selection results in the base game processing. In cases where it is determined that the trigger symbols are not stopped, the CPU 50 repeats this determination processing in the base game processing; however, in cases where it is determined that the trigger symbols are stopped, the processing proceeds to ST83.

In ST83, the CPU 50 determines whether the stopped trigger symbol is the first trigger symbol 97 that allows a shift to the first bonus game, or the second trigger symbol 98 that allows a shift to the second bonus game. Here, in cases where the trigger symbol is the first trigger symbol 97, the CPU 50 displays the display switching instruction key in a specified position on the lower liquid crystal display 4. This display switching instruction key receives switching instructions for the display on the upper liquid crystal display 3.

Here, furthermore, a case is described in which the display switching instruction key is displayed in cases where the stopped trigger symbol is the first trigger symbol 97. However, appropriate changes may be made regarding the display of the display switching instruction key. For example, the system may also be devised so that this key is constantly displayed on the lower liquid crystal display 4 while base game processing is being performed.

Figure 9:
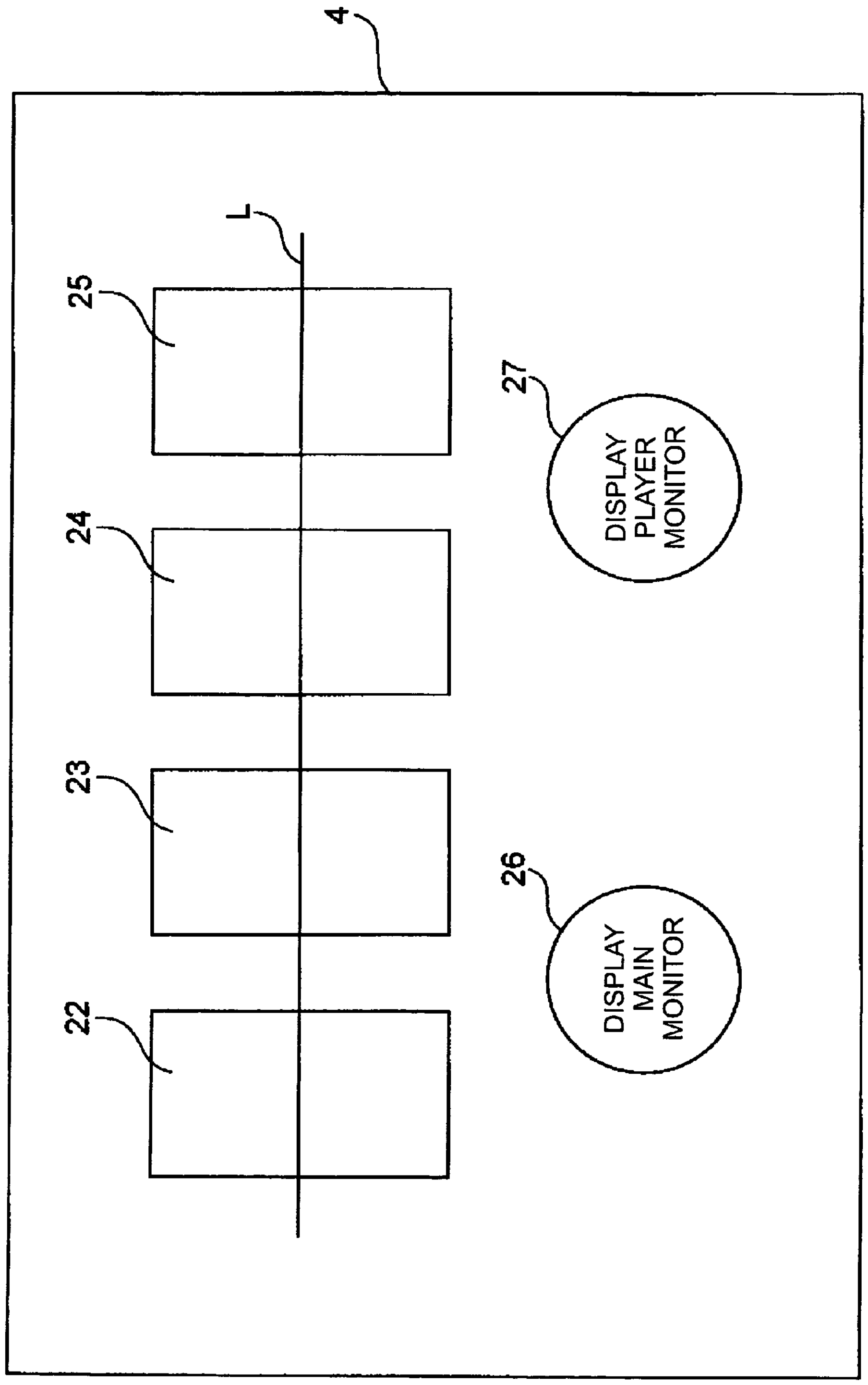
FIG. 9 is a diagram showing a display example of the lower liquid crystal display in which the display switching instruction keys are displayed in the above-mentioned slot machine.

FIG. 9 is a diagram showing an example of the display of the lower liquid crystal display 4 on which the display switching instruction key is displayed in the slot machine 1. As shown in FIG. 9, the display switching instruction key is constructed from a main monitor display instruction key 26 that switches the play content displayed on the upper liquid crystal display 3 from the machine side play content to the management device side play content, and a player monitor display instruction key 27 that switches from the management device side play content to the machine side play content.

After the display switching instruction key is displayed on the lower liquid crystal display 4, the CPU 50 determines whether or not a display switching instruction has been received from the display switching instruction key (ST84). In cases where it is determined that a display switching instruction has been received, the CPU 50 performs play image loading processing of the management device side in order to load image data used to display the management device side play content (ST85). Then, the CPU 50 performs management device side play image display processing that displays the image data loaded in the above-mentioned play image loading processing of the management device side on the upper liquid crystal display 3 (ST86).

On the other hand, in cases where it is determined that a display switching instruction has not been received, the CPU 50 performs play image display processing of the machine side in order to display the image data corresponding to the machine side play contents on the upper liquid crystal display 3 (ST87).

Furthermore, in the present embodiment, when a shift to a first bonus game is allowed by the base game processing (ST81) in the initial state, the system is set so that the machine side play content is displayed on the upper liquid crystal display 3. Accordingly, the determination in ST84 determines whether or not the main monitor display instruction key 26 has been substantially selected. However, the system may also be conversely set so that the play content of the management device side is displayed in the initial state. In this case, it is determined in ST84 whether or not the player monitor display instruction key 27 has been substantially selected.

In cases where the stopped trigger symbol is the second trigger symbol 98 in the determination performed in ST83, the CPU 50 performs second bonus game processing (ST88). Specifically, the CPU 50 performs the execution of the second bonus game, the execution of selections in the second bonus game, control in accordance with the results of these selections (in the case of the roulette game described later, rotational control of the roulette wheel, and determination and control of winning in accordance with the stopped roulette wheel) and the like.

Following the execution of the various types of processing in ST86, ST87 and ST88, the CPU 50 determines whether or not a win has occurred in the first bonus game or the second bonus game (ST89). Furthermore, in the first bonus game, a chance selection is performed in the management device 200, and a notification of winning is transmitted in accordance with the results of this selection. Accordingly, the CPU 50 determines whether or not a win has occurred in accordance with this notification. On the other hand, in the second bonus game, the chance selection is performed in the slot machine 1; accordingly, a determination as to whether or not a win has occurred is made in accordance with the results of this selection.

In cases where it is determined that a win has occurred, the CPU 50 performs credit addition processing which newly adds the game values acquired by the player as a result of this win to the credit value already possessed by this player (ST90). On the other hand, in cases where it is determined that a win has not occurred, the CPU 50 ends the operation of this slot machine 1, and moves to the next game.

Furthermore, in the flow chart shown in FIG. 8, a case is illustrated in which the display of the upper liquid crystal display 3 is switched only once in ST84. However, the control of such a slot machine 1 is not limited to this, but may be appropriately altered. For example, control may be performed in which the play content displayed on the upper liquid crystal display 3 is switched to the management device side play content, and is then returned to the machine side play content. Or, display switching between the management device side play content and machine side play content may be freely performed.

An example of the display of the upper liquid crystal display 3 that is switched in accordance with display switching instructions from the player of the slot machine 1 according to the present embodiment will be described below with reference to a concrete example. Here, a case will be described in which a roulette game is performed as the first bonus game will be described.

In ST83 shown in FIG. 8, a shift to the first bonus game is allowed, and in ST84, in a case where no instructions are received from the player using the display switching instruction key, the CPU 50 displays image data of the machine side play contents on the upper liquid crystal display 3 in ST87.

Figure 10:
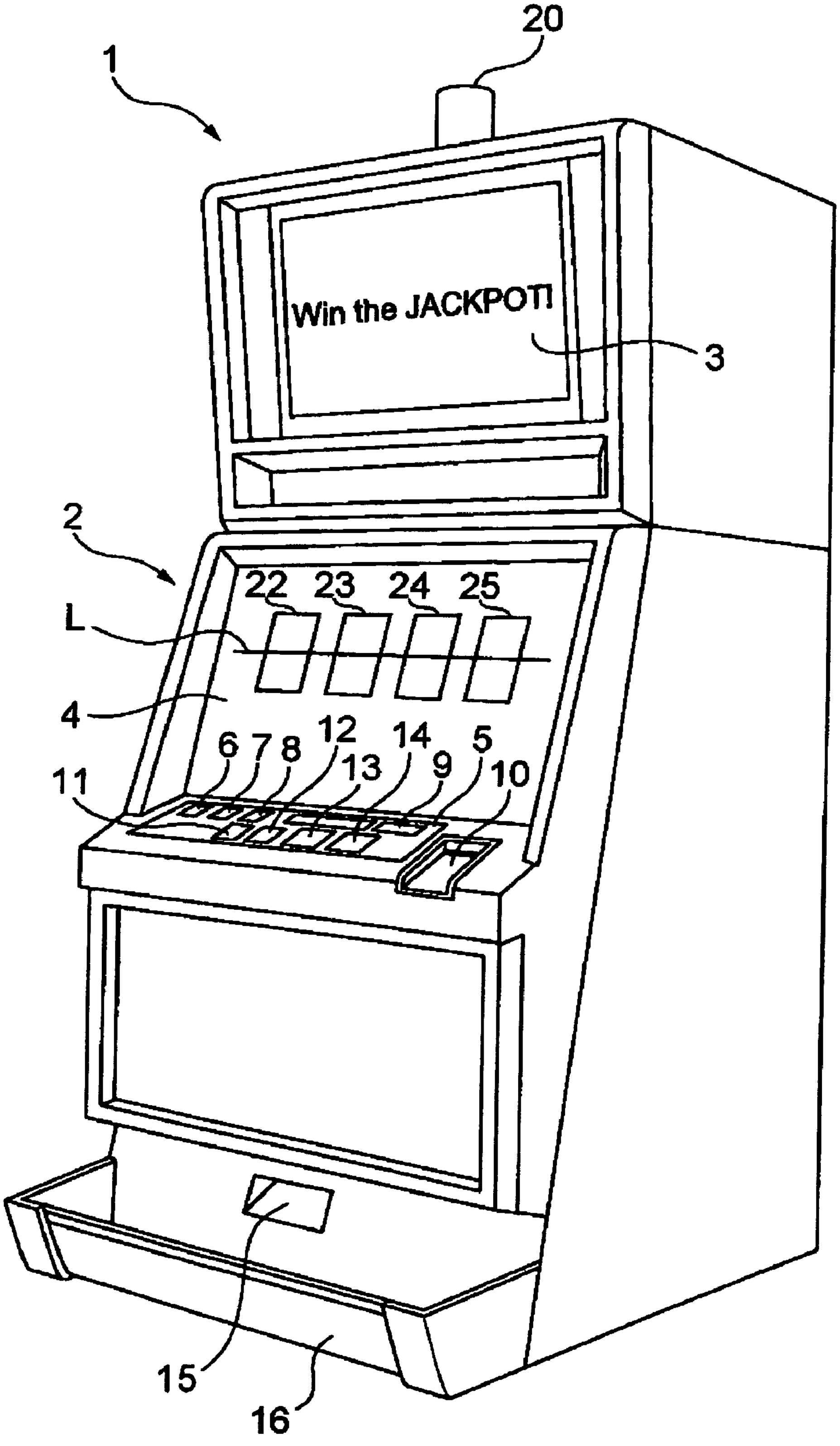
FIG. 10 is a diagram showing the external appearance of a slot machine in which the machine side play contents are displayed in the upper liquid crystal display.

FIG. 10 is a diagram showing the external appearance of the slot machine 1 in which the machine side play contents are displayed on the upper liquid crystal display 3. In FIG. 10, a case is shown in which play contents that continuously display a message urging the acquisition of cumulative game values ("Win the JACKPOT!" in FIG. 10) are displayed in the first bonus game as machine side play contents. In cases where such a message is displayed, the player can confirm the management device side play contents by the main monitor 202 of the management device 200.

On the other hand, in cases where the main monitor display instruction key 26 shown in FIG. 9 is selected in ST84, the CPU 50 loads image data for the play contents of the management device side in ST85, and displays the image data on the upper liquid crystal display 3 in ST86. As a result, the management device side play contents displayed by the main monitor 202 of the management device 200 are displayed on the upper liquid crystal display 3. Accordingly, the player can confirm the management device side play contents by the upper liquid crystal display 3.

Figure 11:
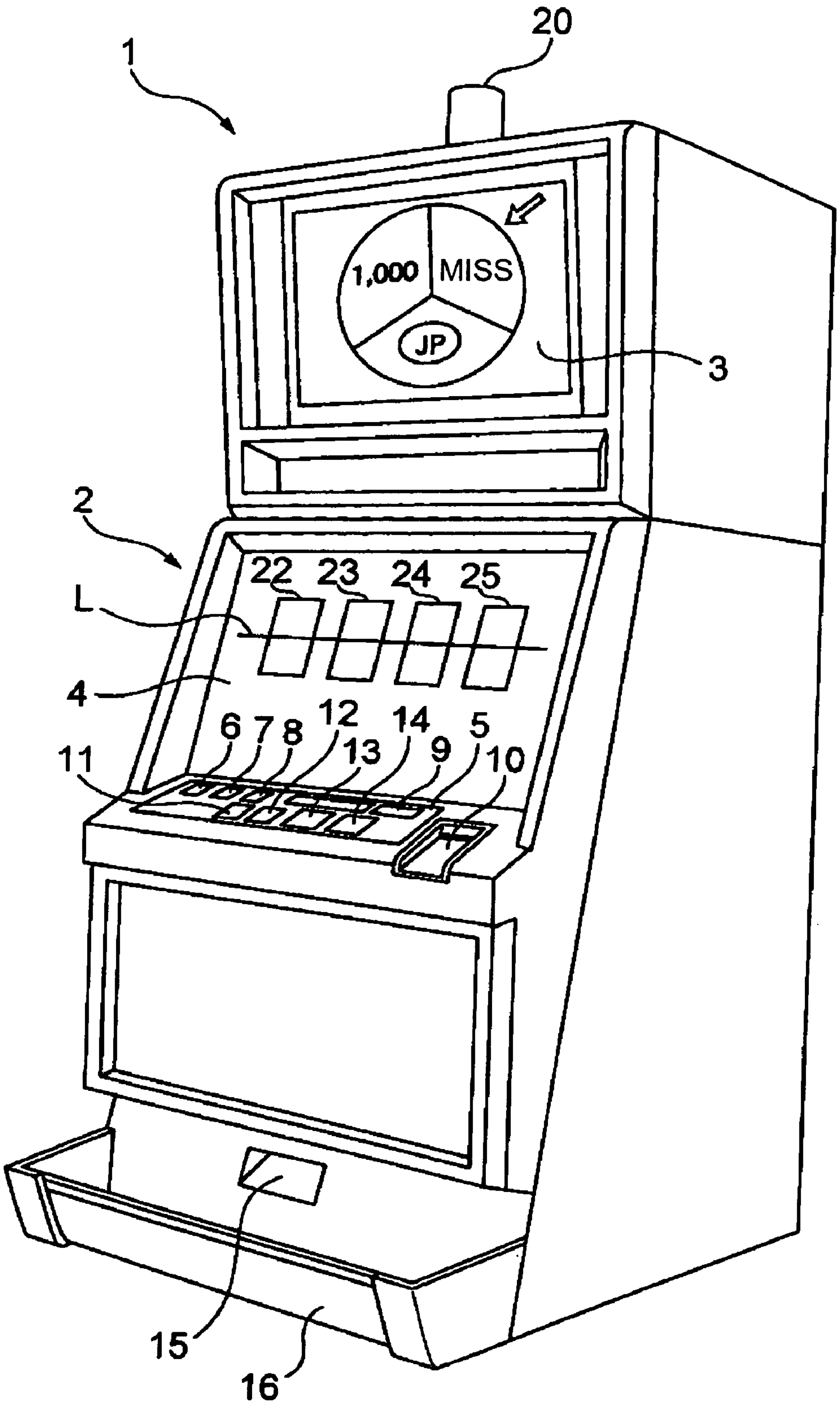
FIG. 11 is a diagram showing the external appearance of a slot machine in which the play contents on the side of the management device are displayed in the upper liquid crystal display.

FIG. 11 is a diagram showing the external appearance of the slot machine 1 in which the management device side play contents are displayed on the upper liquid crystal display 3. As shown in FIG. 11, the play contents of a roulette game corresponding to the first bonus game managed by the management device 200 are displayed on the upper liquid crystal display 3. In the roulette game shown in FIG. 11, either "1000 game values", "cumulative game value jackpot: JP)" or "miss" is selected by chance selection. For example, in cases where the play contents shown in FIG. 10 are displayed on the upper liquid crystal display 3, the same play contents are displayed on the main monitor 202, as shown in FIG. 1.

In the slot machine 1 of the present embodiment, as was described above, the play contents displayed by the upper liquid crystal display 3 are switched to and displayed as the play contents displayed by the main monitor 202 of the management device 200. As a result, since the play contents on the side of the management device 200 can be confirmed by the upper liquid crystal display 3 installed on the slot machine 1, play contents presented on the side of the management device 200 can easily be confirmed on the side of the slot machine 1 even by players who have to pay attention to base games on the side of the slot machine 1.

Furthermore, in the slot machine 1 of the present embodiment, instructions that switch the play contents displayed by the upper liquid crystal display 3 to the play contents displayed by the main monitor 202 of the management device 200 are received from the player via the display switching instruction keys 26, 27, and the display on the upper liquid crystal display 3 is switched in accordance with switching instructions applied to these display switching instruction keys. As a result, since the display on the upper liquid crystal display 3 is switched in accordance with the switching instructions for the play contents applied to the display switching instruction keys, the display on the upper liquid crystal display 3 can be switched at the timing desired by the player. Accordingly, a game machine can be provided which allows easy confirmation on the side of the slot machine 1 of play contents presented on the side of the management device 200, while responding flexibly to the desires of the player.

In particular, in the slot machine 1 of the present embodiment, the display switching instruction keys are disposed on the lower liquid crystal display 4. Since the display switching instruction keys are disposed on the lower liquid crystal display 4 which has variable display windows 22 through 25, the display on the upper liquid crystal display 3 can easily be switched even during play on the slot machine 1.

Furthermore, in the slot machine 1 of the present embodiment, the play content that is displayed by the upper liquid crystal display 3 is switched to and displayed as the play content of the first bonus game that is managed by the management device 200. As a result, the play content of the first bonus game that is managed by the management device 200 can be confirmed by the upper liquid crystal display 3 disposed on the slot machine 1. Accordingly, a game machine can be provided in which the play contents of bonus games that are directly linked to a heightened feeling of anticipation on the part of the player can easily be confirmed on the side of the slot machine 1.

Furthermore, the present invention is not limited to the embodiment described above; various alterations may be made without departing from the spirit of the invention. In regard to the size, shape and the like shown in the appended figures in the above-mentioned embodiment, the present invention is not limited to these; various alterations are possible within ranges that allow the effect of the present invention to be manifested. In addition, the present invention can be worked with various alterations being made as long as there is no departure from the scope of the object of the present invention. Modifications of the present invention will be described below for example.

In the above-mentioned embodiment, a case was described in which the slot machine 1 loaded image data for the play contents on the side of the management device, and this image data was displayed on the upper liquid crystal display 3. However, appropriate alterations are possible in the control that is used when the management device side play contents are displayed. For example, the image data that is used to display the management device side play contents may also be stored in the slot machine 1 (e.g., in the play content storing portion 305). Furthermore, it would also be possible to devise the system so that only information specifying the current play contents is received from the management device 200, and the same image data as the management device side play content is displayed on the upper liquid crystal display 3 in accordance with this information. In this case, the amount of data communicated via the communications network 300 can be reduced, so that the game system 100 can be operated more efficiently.

In the above-mentioned embodiment, a case was described in which the play contents displayed on the upper liquid crystal display 3 was switched to the play contents on the side of the management device. However, appropriate alterations may be made regarding the play contents on the side of the management device 200 that are displayed on the upper liquid crystal display 3. For example, the system may be devised so that play contents are displayed that are used to inform players or spectators in the vicinity of the slot machine 1 of cumulative game values managed by the management device 200.

Moreover, the system and the slot machine 1 may be devised so that the play contents of the lower liquid crystal display 4 are displayed on the upper liquid crystal display 3 in accordance with the operation of the display switching instruction keys. Additionally or alternatively, the play contents displayed on the slot machine 1*a* of the lower liquid crystal display 4 may be displayed on the main monitor 202 of the management device 200 or the upper liquid crystal display 3 of the other slot machines 1*b* through 1*d* in accordance with the operation of the display switching instruction keys of the slot machine 1*a*. According to these modifications, other players or spectators in the vicinity of the slot machine 1*a* can easily confirm the status of the slot machine 1*a* and heighten the feeling of anticipation on the part of the other players or spectators.

Furthermore, the system and the slot machine 1 may be devised so that the information or summary relating to the play contents to be displayed on the upper liquid crystal display 3 are displayed on the lower liquid crystal display 4 when the player of the slot machine 1 can switch the display on the upper liquid crystal display 3. Also according to this modification, the player can more easily confirm the play contents of bonus games and the like, which are managed by the management device 200, on the side of the slot machine 1.

Moreover, in the above-mentioned embodiment, a cases was described in which a shift was allowed to the first bonus game. However, appropriate alterations may be made regarding the timing at which the display of the upper liquid crystal display 3 is switched. For example, the display on the upper liquid crystal display 3 may also be switched during base game processing in the slot machine 1 or the like.

As described above, the present invention makes it possible to provide a game machine and game system that allow a player on the side of the game machine to easily confirm the play contents that are managed by the information management device.

Specifically, the present invention switches the play contents displayed by the display of the game machine to the display contents displayed by the display device of the information management device, and displays these contents. Furthermore, makes it easy to confirm on the game machine side the play contents presented on the side of the information management device. Accordingly, the present invention has industrial applicability on these points.

What is claimed is:

1. A game machine comprising:

(a) a first display for displaying a base game having a plurality of symbols rearranged on the first display;

(b) a second display different from the first display, the second display for displaying contents related to the base game;

(c) a communication section for establishing a communication connection with a management device for executing a link type game different from the base game by communication connection with the game machine, the link type game for allowing a player of the game machine to participate together with at least one other player, the management device for providing a predetermined award to a predetermined player participating in the link type game in a case where an accumulated amount of a game value in the link type game reaches a predetermined value, the management device including a display device for displaying contents related to the link type game;

(d) an input device allowing the player to make an input operation, the input device being capable of receiving the input operation in accordance with a predetermined condition; and (e) a controller configured to:

(i) display the normal game having the plurality of symbols rearranged on the first display;

(ii) display on the second display the contents related to the base game;

(iii) judge as to whether any of the symbols rearranged on the first display during the base game in (i) is a symbol for shifting from the base game by the game machine to the link type game by the management device;

(iv) in a case where judgment is made in (iii) that the symbol for shifting from the base game by the game machine to the link type game by the management device is rearranged, enable the input device so as to allow the player to make the input operation, and establish communication connection with the management device through the communication section upon authorization of shifting from the base game by the game machine to the link type game by the management device;

(v) judge as to whether the input section enabled to receive the input operation in the (iv) is subjected to the input operation by the player; and (vi) in a case where judgment in the (v) is made that the input section is subjected to the input operation by the player, transmit from the communication section to the management device, a request for output of information on the contents related to the link type game displayed on the display device of the management device; receive through the communication section the information on the contents related to the link type game displayed on the display device of the management device, the information transmitted from the management device in accordance with the request for the output; and based on the received information on the contents related to the link type game, and switch contents displayed on the second display from the contents related to the base game to the contents related to the link type game;

wherein: the input section further includes: a first input part for switching the contents displayed on the second display from the contents related to the base game to the contents related to the link type game displayed on the display device of the management device; and a second input part for switching the contents displayed on the second display from the contents related the link type game to the contents related to the base game;

and the controller is further configured to: execute (vi) in a case where judgment is made that the first input part is subjected to the input operation by the player; and switch the contents displayed on the second display from the contents related to the link type game to the contents related to the base game in a case where judgment is made that the second input part is subjected to the input operation by the player.

2. The game machine according to claim 1, wherein:

the controller is further configured to execute (ii) in a case where judgment is made in (v) that the input section is not subjected to the input operation by the player.

* * * * *